(12) United States Patent
Boström (10) Patent No.: US 9,715,733 B2
(45) Date of Patent: Jul. 25, 2017

(54) METHOD FOR CALIBRATION OF A ROAD SURVEILLANCE SYSTEM

(71) Applicant: Kapsch TrafficCom AB, Jönköping (SE)

(72) Inventor: Göran Boström, Huskvarna (SE)

(73) Assignee: Kapsch TrafficCom AB, Jönköping (SE)

(*) Notice: Subject to any disclaimer, the term of this patent is extended or adjusted under 35 U.S.C. 154(b) by 328 days.

(21) Appl. No.: 14/505,772

(22) Filed: Oct. 3, 2014

(65) Prior Publication Data

US 2015/0097948 A1    Apr. 9, 2015

(30) Foreign Application Priority Data

Oct. 4, 2013  (EP) .................................... 13187364

(51) Int. Cl.
| | |
|---|---|
| *H04N 7/18* | (2006.01) |
| *G06T 7/00* | (2017.01) |
| *G08G 1/017* | (2006.01) |
| *G08G 1/04* | (2006.01) |
| *G07B 15/00* | (2011.01) |

(Continued)

(52) U.S. Cl.
CPC ................ *G06T 7/004* (2013.01); *G06T 7/70* (2017.01); *G06T 7/80* (2017.01); *G07B 15/00* (2013.01); *G08G 1/017* (2013.01); *G08G 1/04* (2013.01); *H04N 5/247* (2013.01); *H04N 7/181* (2013.01); *H04N 17/00* (2013.01); *G06T 2207/10004* (2013.01); *G06T 2207/30204* (2013.01);

(Continued)

(58) Field of Classification Search
CPC ...................................................... G06T 7/004

USPC .......................................................... 348/137
See application file for complete search history.

(56) References Cited

U.S. PATENT DOCUMENTS

| 5,467,634 A | * | 11/1995 | Brady ................. G01B 11/022 340/937 |
| 2006/0164295 A1 | | 7/2006 | Focke et al. |

(Continued)

FOREIGN PATENT DOCUMENTS

EP       2306428 A1    4/2011

OTHER PUBLICATIONS

Extended Search Report received for European Patent Application No. 13187364.8, mailed on Mar. 18, 2014, 4 pages.

(Continued)

*Primary Examiner* — Richard Torrente
(74) *Attorney, Agent, or Firm* — Fiala & Weaver P.L.L.C.

(57) ABSTRACT

A road calibration system and a method for calibration of a road surveillance system are provided. The road surveillance system monitors a surveillance area of a road using vehicle surveillance devices. The vehicle surveillance devices measure a position of a vehicle passing the surveillance area and are synchronized with a global timing signal. In order to calibrate the vehicle surveillance devices such that a position determination of the vehicle surveillance devices is equal, a calibration vehicle with predefined calibration markers is passed through the surveillance area. During the passage each measurement device measures a position of an assigned calibration marker at a predetermined time and compares a measured distance between the positions of the calibration markers with a reference distance between the positions of the calibration markers.

19 Claims, 5 Drawing Sheets

(51) Int. Cl.
*H04N 5/247* (2006.01)
*H04N 17/00* (2006.01)
*G06T 7/80* (2017.01)
*G06T 7/70* (2017.01)

(52) U.S. Cl.
CPC ............ *G06T 2207/30232* (2013.01); *G06T 2207/30236* (2013.01)

(56) References Cited

U.S. PATENT DOCUMENTS

| | | |
|---|---|---|
| 2009/0231161 A1 | 9/2009 | Malarky |
| 2012/0206602 A1 | 8/2012 | Clucas et al. |
| 2012/0320190 A1* | 12/2012 | Natroshvili ............. G06T 5/006 348/135 |
| 2014/0139674 A1* | 5/2014 | Aoki ....................... G06T 7/002 348/148 |

OTHER PUBLICATIONS

First Examination Report received for New Zealand Patent Application No. 700390, mailed on Sep. 8, 2015, 5 pages.

\* cited by examiner

METHOD FOR CALIBRATION OF A ROAD SURVEILLANCE SYSTEM

CROSS-REFERENCE TO RELATED APPLICATION(S)

This application claims priority to European Patent Application No. 13 187 364.8, filed on Oct. 4, 2013, the entirety of which is incorporated by reference herein.

BACKGROUND

Technical Field

The subject matter relates to a method for calibration of a road surveillance system. Said road surveillance system is adapted to monitor a surveillance area of a road and comprises a plurality of vehicle surveillance means. Said plurality of vehicle surveillance means are adapted to measure a position of a vehicle passing said surveillance area, are controlled by an ECU, and are synchronized with a global timing signal.

The method further relates to an apparatus for performing the method.

Background Art

Road surveillance systems are known in the art. A road surveillance system comprises a plurality of one vehicle surveillance means. The vehicle surveillance means needs to be calibrated in order to function properly. This has previously been done by means of that calibration markers are manually arranged on the road surface in order for the vehicle surveillance means to be calibrated against. The vehicle surveillance means are then manually adjusted by that maintenance personnel physically changes the direction and/or position of the vehicle surveillance means such that a desired accuracy is obtained. The calibration requires that the road on which the road surveillance system is located is closed when the calibration markers are arranged on the road surface and possibly also in order to ensure access to the road surveillance system and to ensure the safety of the calibration personnel. This may cause congestions if a road is closed during high traffic conditions or that calibration only can take place at night when traffic is light leading to uncomfortable working conditions for the calibration personnel.

There is thus clearly a need for an improved method for calibrating a road surveillance system with a plurality of vehicle surveillance means

BRIEF SUMMARY

The subject matter relates to a method for calibration of a road surveillance system. Said road surveillance system is adapted to monitor a surveillance area of a road and comprises a plurality of vehicle surveillance means. Said plurality of vehicle surveillance means are adapted to measure a position of a vehicle passing said surveillance area, are controlled by an ECU, and are synchronized with a global timing signal. The method comprises, in order to calibrate said plurality of vehicle surveillance means such that a position determination of said plurality of vehicle surveillance means is equal, passing a calibration vehicle through said surveillance area. Said calibration vehicle is provided with a plurality of predefined calibration markers, wherein at least one marker is assigned to each of said plurality of vehicle surveillance means. Said calibration markers are provided at predetermined positions upon said calibration vehicle. During the passage of said calibration vehicle through said surveillance area each surveillance means measures a position of its assigned calibration markers wherein said measuring is performed at a predetermined time. The method also comprises selecting a reference vehicle surveillance means, which defines a reference coordinate system, comparing said measured position of a calibration marker assigned to a vehicle surveillance means with a position of a calibration marker assigned to said reference vehicle surveillance means and calibrating said plurality of vehicle surveillance means such that the position of the respective calibration markers in said reference coordinate system correspond to an expected position in said reference coordinate system.

Said plurality of vehicle surveillance means may comprise a video tracking device and a microwave transceiver, an identification registration camera, a photo sensor, a laser or other sensing means which can be used for position measurements.

One advantage with the method according to embodiments is that the vehicle surveillance means can be mounted on the road surveillance system with an initial level of measuring accuracy. The final level of accuracy is achieved by calibrating the vehicle surveillance means according to the method. Other advantages of embodiments of the method are that the calibration and re-calibration of the vehicle surveillance system can be done without interrupting the traffic flow.

By having the vehicle surveillance means synchronized by a global timing signal, global in this case meaning shared by all the vehicle surveillance means on one road surveillance system, all vehicle surveillance means can be calibrated simultaneously. By using a calibration vehicle passing through the surveillance area of the road surveillance system, reference markers on a road surface in the surveillance area are no longer necessary. This means that the need for closing the road and having maintenance crew physically altering the vehicle surveillance means for calibrating them is removed. This ensures that calibration can be performed easier and whenever required by passing a calibration vehicle through the surveillance area of the road surveillance system. Calibration can for instance be done one or a few times per month to ensure an even quality for the road surveillance system.

One of the vehicle surveillance means is used as a reference vehicle surveillance means from which all other vehicle surveillance means are calibrated. The reference vehicle surveillance means defines a reference coordinate system. This may be, for example, the vehicle surveillance means with the highest accuracy. The measurements from the reference vehicle surveillance means of the calibration markers become reference positions. These reference positions are compared to the positions measured by the remaining vehicle surveillance systems. The reference positions can be used to calculate reference distances, and thus positions, to calibration markers on the calibration vehicle which do not correspond to the reference positions as the distances between all calibration markers are known.

The positions of the calibration markers upon the calibration vehicle are all measured at the same predetermined time or times controlled by the global timing signal. At the predetermined time or times the position of the calibration markers in the reference coordinate system are known.

Said plurality of vehicle surveillance means can for example comprise a video tracking device and a microwave transceiver. The video tracking device continuously tracks the vehicles and records passages through the road surveillance system. The video tracking device may be used as a reference for calibration for the remaining vehicle surveillance means due to its accuracy in both timing and spatial resolution. The microwave transceiver communicates with for instance a transponder on the vehicles passing through the road surveillance system and is used for instance to determine which direction a vehicle is passing through the road surveillance system.

Said plurality of vehicle surveillance means may further comprise an identification registration camera. The identification registration camera is used to register the license plate or other vehicle identification markers in order to for instance be able to submit information to law enforcement or a toll invoicing system.

The identification registration camera performs its identification at a certain specific position in the road surveillance area, for instance at a focal point of the identification registration camera. This specific position corresponds to a specific time according to the global timing signal which may not correspond to a predetermined time at which the calibration takes place for other vehicle surveillance means. In order to perform the calibration for the identification registration camera the positions of the calibration markers measured by the reference vehicle surveillance means are interpolated to a position which corresponds to a position measured at the same predetermined time as the identification registration camera.

At least one calibration marker may comprise a predefined pattern, such as a checkered pattern, striped pattern, spiral pattern or circular pattern. These are used for the vehicle surveillance means which detect optical patterns. The predefined pattern may further comprise a known license plate or known text located on the calibration vehicle. This may be used for the identification registration camera. The calibration marker may also comprise a known transponder used for the microwave transceiver.

Said method may be initiated in that said road surveillance system recognizes said at least one of said calibration markings. This can be done when the vehicle surveillance means whose surveillance area first is entered by the calibration vehicle registers a known calibration marker. The known calibration marker may as described above be a visual marker and/or a transponder marker. When using a predefined pattern scaling, distortion and/or other aberrations can be corrected for in the calibration. In order to correctly determine the position and rotation of the reference coordinate system the position of at least three calibration markers need to be determined for each position measurement of the vehicle.

Said position measurements may be performed a plurality of number of times during the passage of said calibration vehicle. In order to achieve a higher degree of accuracy more than one position measurement can be made during the passage of the calibration vehicle. The calibration can then be made by selecting one of the following calibration values: Selecting the position measurement with the lowest deviation as reference, selecting the position measurement with the highest deviation as reference, selecting the median deviation as reference, calculating an average of the deviation of all position measurements and/or some other kind of calibration value using one or more of the plurality of position measurements.

Said calibration may be performed in that when a deviation between a measured position, measured by different vehicle surveillance means, and an expected position in the reference coordinate system is determined, a correction is added to an algorithm adjusting the measured position to correspond to the expected position. This means that a vehicle surveillance means which measures a position which does not correspond to the expected position will be calibrated by means of a correction which adds and/or subtracts to the measured position of said vehicle surveillance means.

The system may issue a maintenance alert if any one of the plurality of vehicle surveillance means malfunctions. The maintenance alert may also be issued if a deviation between a measured position of said calibration markers and an expected position of said calibration markers in the reference coordinate system exceeds a threshold value. The maintenance alert can thereby indicate that the deviation is too large for a calibration to be performed and that a manual calibration is required.

The subject matter further relates to a road surveillance system for performing the method previously described. The road surveillance system is adapted to monitor a surveillance area of a road. The road surveillance system comprises a plurality of vehicle surveillance means where said plurality of vehicle surveillance means are synchronized by a global timing signal.

The apparatus according to embodiments is arranged to perform the method described above.

The road surveillance system may for example be a road toll system, a traffic monitoring system used for measuring traffic density or congestions or a surveillance system used by law enforcement or for security purposes.

Further features and advantages, as well as the structure and operation of various embodiments, are described in detail below with reference to the accompanying drawings.

Embodiments will now be described with reference to the accompanying drawings.

DETAILED DESCRIPTION

Figure 1:
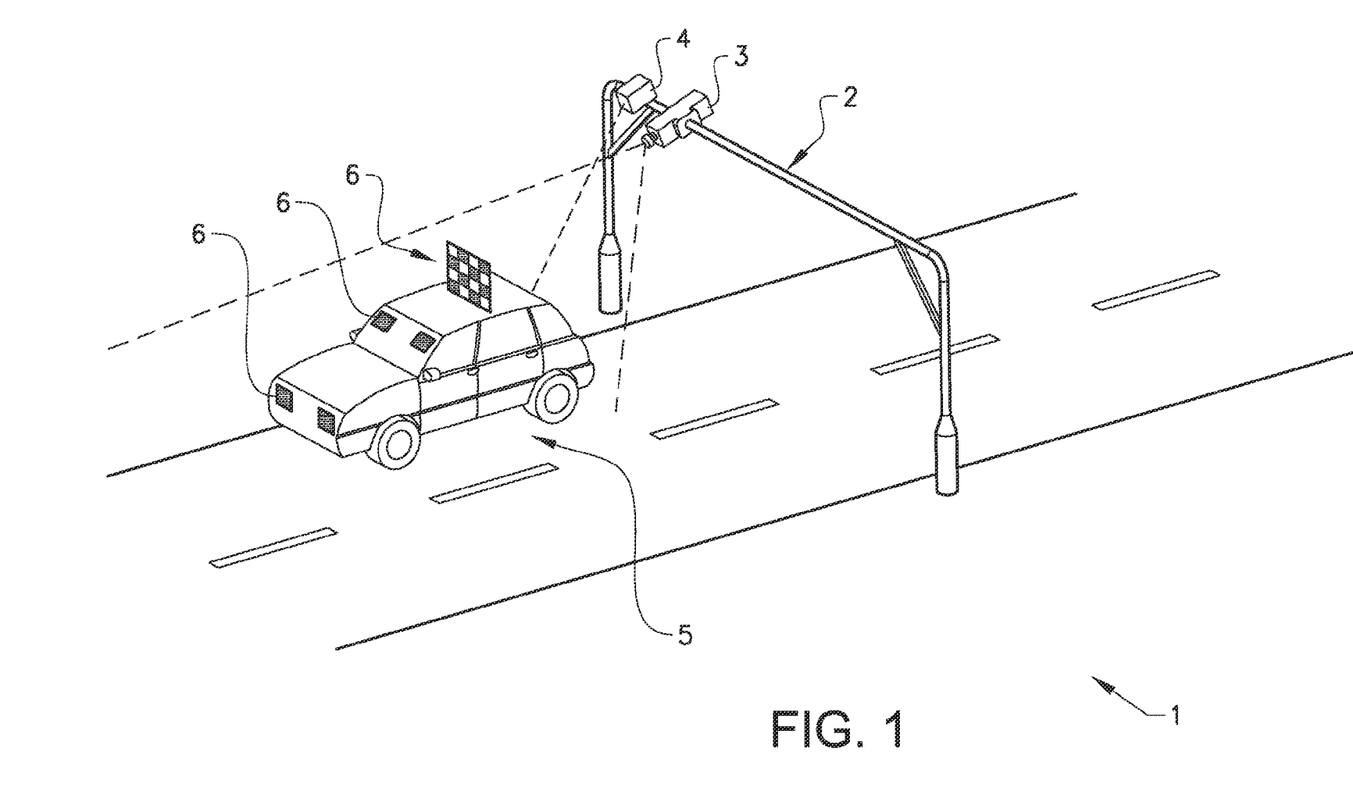
FIG. 1 schematically shows a perspective view of a road surveillance system according to example embodiments.

FIG. 1 schematically shows a perspective view of a road surveillance system 1 according to embodiments. The road surveillance system 1 comprises a gantry 2 on which a first vehicle surveillance means 3 and a second vehicle surveillance means 4 are mounted. Instead of a gantry 2 a number of other possible mounting alternatives are conceivable. The vehicle surveillance means may be mounted on posts, on an overpass, on the entrance of a tunnel just to name a few examples. The road surveillance system 1 further comprises an electronic control module (ECU) which controls the function of the road surveillance system 1. The ECU may be in Ethernet connection with a server that stores data from the road surveillance system 1 and which may set a global timing signal to all vehicle surveillance means.

FIG. 1 also shows a calibration vehicle 5 upon which predefined calibration markers 6 are positioned. The first vehicle surveillance means 3 are arranged to measure the position of its assigned calibration marker at a predetermined time t1. At the same time t1 the second vehicle surveillance means 4 are arranged to measure the position of its assigned calibration marker. Two vehicle surveillance means may have the same calibration marker assigned to them. More than one calibration marker may be assigned to one vehicle surveillance means assuming the vehicle surveillance means use the same measurement technique, i.e. optical calibration markers 6 for cameras or microwave transponders for the microwave transceiver. Having calibration markers 6 for different vehicle surveillance means placed in the same position makes it easier to do the comparison between calibration markers when performing the method. In FIG. 1 one standing reference marker 6 is shown. It is of course also possible to have a reference marker 6 placed flat on the calibration vehicle 5.

Figure 2:
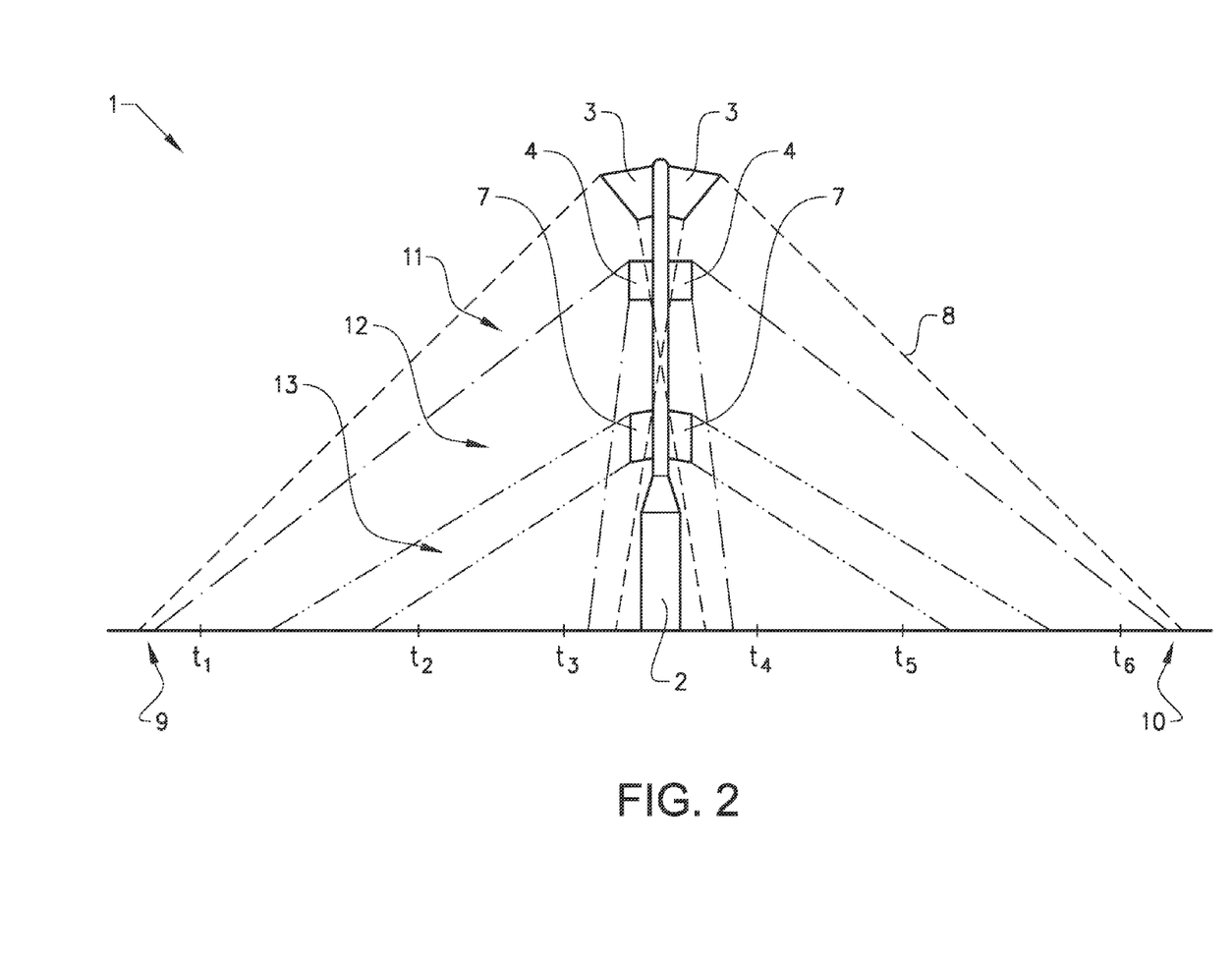
FIG. 2 schematically shows a side view of a road surveillance system according to example embodiments.

FIG. 2 schematically shows a side view of a road surveillance system 1 according to embodiments. The road surveillance system 1 in FIG. 2 comprises besides a first vehicle surveillance means 3 and a second vehicle surveillance means 4 also an identification registration camera 7 which for instance can be used to register the license number of a vehicle passing through the road surveillance system 1. The vehicle surveillance means in FIG. 2 each comprise a forward looking vehicle surveillance means and a rearward looking vehicle surveillance means having the same characteristics. This is merely illustrative and it is possible to have different forward looking vehicle surveillance means and rearward looking vehicle surveillance means. The extent of a surveillance area 8 of the vehicle surveillance system is determined by a first detection point 9 of a vehicle by the vehicle surveillance system to a last detection point 10 of the vehicle surveillance system. The first surveillance means has a first surveillance area 11, the second surveillance means has a second surveillance area 12 and the identification registration camera 7 has a third surveillance area 13. In FIG. 2 the first detection point 9 of the vehicle surveillance system is the beginning of the first surveillance area 11 of the first vehicle surveillance means 3. The last detection point 10 is the end of the first surveillance of the first vehicle surveillance means 3.

With reference to FIG. 2 the method will be explained further. When the road surveillance system 1 detects the calibration vehicle 5 (not shown in FIG. 2) entering the surveillance area 8 at the first detection point 9 by detecting a predefined calibration marker on the calibration vehicle 5, the road surveillance system 1 starts the calibration method. A first position measurement is taken at a position corresponding to time t1 indicated in FIG. 2. At this position at least the first vehicle surveillance means 3 and the second vehicle surveillance means 4 measures the position of their assigned predefined calibration markers 6. One of the position measurements of the first vehicle surveillance means 3 or second vehicle surveillance means 4 are used to set up a reference coordinate system (not shown) against which all other position measurements are calibrated. This reference coordinate system may, for example, set up by the vehicle surveillance means with the highest spatial and temporal resolution.

If necessary, position measurements can be taken at positions corresponding to times t2, t3, t4, t5 and t6 in order to improve the calibration.

In FIG. 2 the identification registration camera 7 does not have a third surveillance area 13 overlapping a position of the vehicle surveillance means which is used to set up the reference coordinate system at the positions corresponding to any of the times t1-t6. This means that in order to calibrate the identification registration camera 7 reference position measurements of the predefined calibration marker assigned to the identification registration camera 7 at for instance times t1 and t2, must be interpolated to time t1', in order for calibration of the identification registration camera 7 to be made correctly. If the gantry 2 comprises vehicle surveillance means facing in different directions calibration is made at least once for each side of the gantry 2.

Figure 3A:
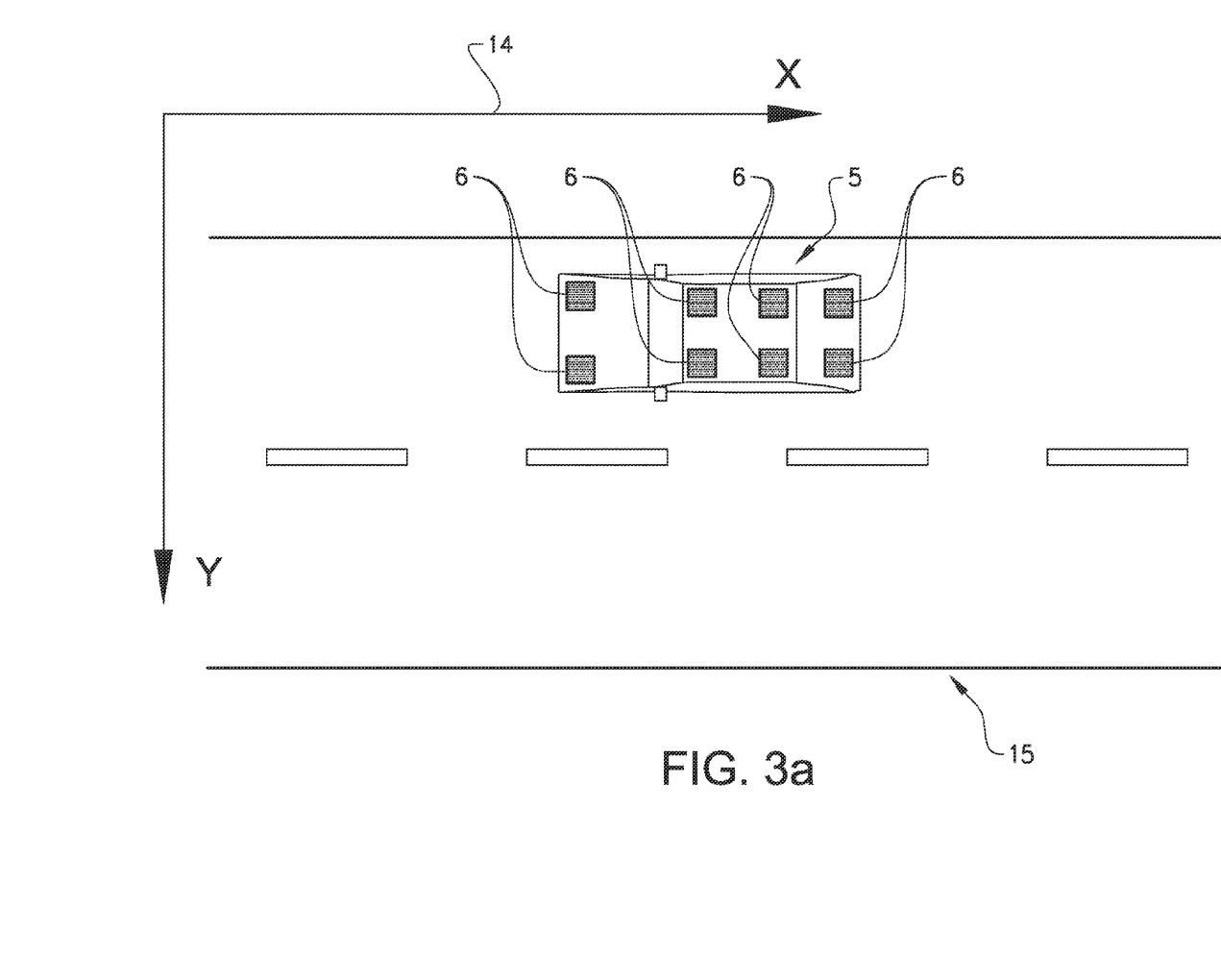
FIG. 3a schematically shows a view of a reference system used for the method according to example embodiments.

FIG. 3a schematically shows a view of a reference coordinate system 14 used for the method according to embodiments. The reference coordinate system 14 is in this example set up by a video tracking device. FIG. 3a further shows a calibration vehicle 5 on a road 15 as seen from the vehicle surveillance means used for the reference coordinate system 14. The calibration vehicle 5 comprises a number of calibration markers 6 for which the distances between them are all known. The ECU of the road surveillance system 1 is arranged to set up the reference coordinate system 14 wherein the position of each predefined calibration marker from a chosen origin point is known. This means that the positions and also the distances between the calibration markers 6 in the reference coordinate system 14 can be used for the calibration method. In FIG. 3a the reference coordinate system 14 is a two-dimensional coordinate system. The method can of course be extended to three-dimensional coordinate systems.

Figure 3B:
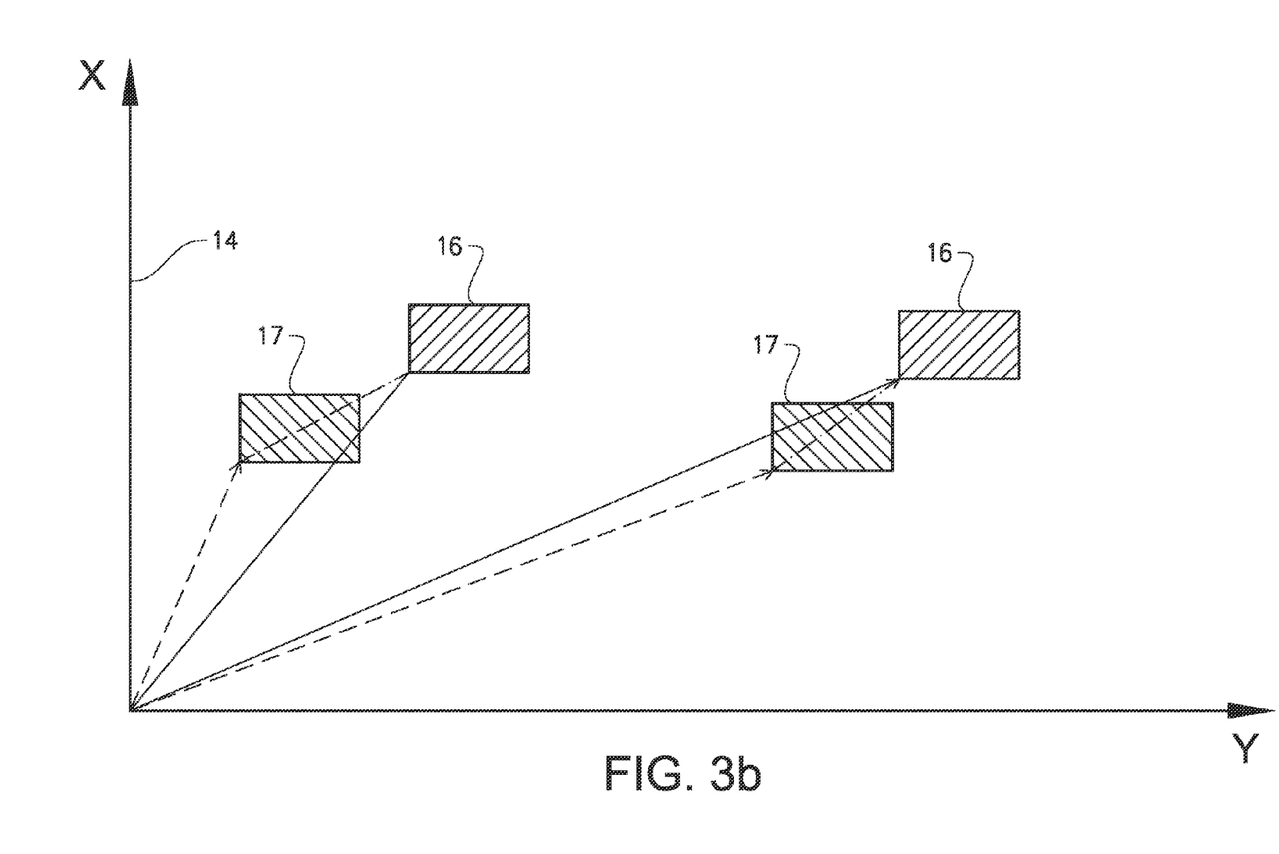
FIG. 3b schematically shows an example of a calibration of the system according to example embodiments.

FIG. 3b schematically shows the calibration principle. In FIG. 3b two sets of calibration markers 16, 17 located at two positions on the calibration vehicle 5 are shown. The sets of calibration markers 16, 17 are measured by two vehicle surveillance means. Two sets of calibration markers are used for illustrating the principle of the method. The method can be extended to any number of calibration markers or sets of calibration markers. The first set of calibration markers 16 correspond to the reference positions for which all other calibration markers are calibrated. This position is determined by the video tracking device which sets up the reference coordinate system 14. As an example measured positions of the second set of calibration markers 17 are shown as measured by a second vehicle reference means. The first set of calibration markers 16 are in this case visual calibration markers assigned to the video tracking device. The second set of calibration markers 17 can for instance be transponders located at the same position as the visual calibration markers assigned to the microwave transceiver. This means that the reference positions of the first set of calibration markers 16 should correspond to the measured positions of the second set of calibration markers 17. As the reference coordinate system 14 is known the measured positions are readily computed for comparison with the reference positions.

In FIG. 3b the second set of calibration markers 17 are shown to be located at a distance from the first set of calibration markers 16. There is thus an error in measured position from the microwave transceiver which needs to be corrected in the calibration. The ECU, knowing the reference position of the first set of calibration markers 16 and the second set of calibration markers 17 can thereby calibrate the position of the second set of calibration markers 17 such that the positions of the first set of calibration markers 16 and the second set of calibration markers 17 correspond in the reference coordinate system 14. In FIG. 3b all the errors in position of the second set of calibration markers 17 are the same.

Figure 4:
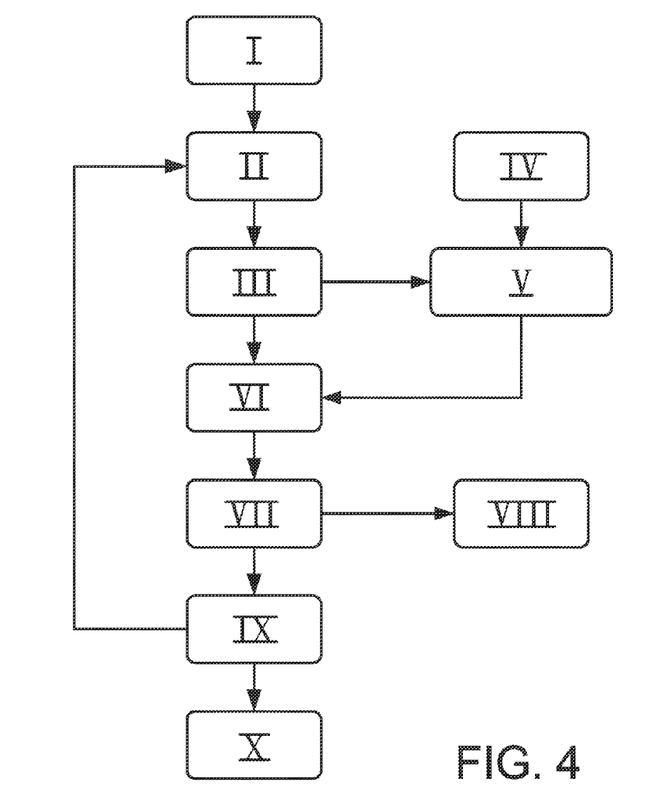
FIG. 4 schematically shows a flowchart of the calibration process according to example embodiments.

FIG. 4 schematically shows a flowchart of the calibration process according to embodiments. In step I a calibration vehicle 5 enters the surveillance area 8 and is detected by the road surveillance system 1 at the first detection point 9. In step II a first vehicle surveillance means 3 and a second vehicle surveillance means 4 measures the position of their assigned calibration markers at least at a predetermined time t1. In step III the measurements of the first surveillance means 3 form the basis for a reference coordinate system 14. In step IV the identification registration camera 7 measures a position of its assigned calibration markers at time t1'. In step V the reference positions measured by said first vehicle surveillance means 3 is interpolated to an updated position corresponding to a position measured at the same predetermined time t1' as identification registration camera 7. This is indicated by the arrow between step III and step V. In step VI the measured positions of said calibration markers are compared with reference positions of said calibration markers. In step VII corrections are calculated for each calibration marker measured by the second vehicle surveillance means 4 and the identification registration camera 7 in order for the measured positions of their assigned calibration markers to correspond to the reference position of their assigned calibration markers. In step VIII the vehicle surveillance system 1 issues a maintenance alert if any one of the plurality of vehicle surveillance means is deemed to malfunction or if a deviation between a measured position of said calibration markers and an expected position of said calibration markers in the reference coordinate system exceeds a threshold value. In step IX said plurality of vehicle surveillance means are calibrated, such that the measured positions of the calibration markers correspond to the reference positions of said calibration markers by adding corrections to each calibration marker measured by second vehicle surveillance means 4 and the identification registration camera 7. After step IX the vehicle surveillance system may determine that a new measurement needs to be performed and restarts the method at step II. This can be done while the calibration vehicle is still within the surveillance area. After step IX the system may determine that the calibration is complete and reverts to normal operating mode in step X.

This process can, as mentioned above, be repeated for more predetermined times already in second step 19 and/or for vehicle surveillance means facing in opposite directions on a vehicle surveillance system.

Reference signs mentioned in the claims should not be seen as limiting the extent of the matter protected by the claims, and their sole function is to make claims easier to understand.

CONCLUSION

As will be realised, the embodiments are capable of modification in various obvious respects, all without departing from the scope of the appended claims. Accordingly, the invention is not limited to the embodiments presented and, instead, comprises all variants and modifications that fall within the scope of the claims, which follow, and the drawings and the description are to be regarded as illustrative in nature, and not restrictive.

What is claimed is:

1. A method for calibration of a road surveillance system, wherein said road surveillance system is adapted to monitor a surveillance area of a road and comprises a plurality of vehicle surveillance means, the vehicle surveillance means having at least partly equal coverage of the surveillance area, wherein said plurality of vehicle surveillance means are
   adapted to measure a position of a vehicle passing said surveillance area,
   controlled by an electronic control unit (ECU), and
   synchronized with a global timing signal,
   wherein in order to calibrate said plurality of vehicle surveillance means such that a position determination of said plurality of vehicle surveillance means are equal;
   passing a calibration vehicle through said surveillance area, wherein said calibration vehicle is provided with a plurality of predefined calibration markers, wherein at least one marker is assigned to each of said plurality of vehicle surveillance means and said calibration markers are provided at predetermined positions upon said calibration vehicle, wherein during the passage of said calibration vehicle through said surveillance area each vehicle surveillance means;
   measuring a position of its assigned calibration markers, wherein
       said measuring is performed at a predetermined time, and
       selecting a reference vehicle surveillance means, which defines a reference coordinate system,
       comparing said measured position of a calibration marker assigned to a vehicle surveillance means with a position of a calibration marker assigned to said reference vehicle surveillance means, and
       calibrating said plurality of vehicle surveillance means such that the position of the respective calibration markers in said reference coordinate system correspond to an expected position in said reference coordinate system.

2. The method according to claim 1, wherein said position measurements are performed a plurality of a number of times during the passage of said calibration vehicle.

3. The method according to claim 1, wherein said plurality of vehicle surveillance means at least comprises a video tracking device and a microwave transceiver.

4. The method according to claim 3, wherein said plurality of vehicle surveillance means further comprises an identification registration camera.

5. The method according to claim 4, wherein a position measured by said identification registration camera is interpolated or extrapolated to an updated position corresponding to a position measured at the same predetermined time as the first and second vehicle surveillance means.

6. The method according to claim 1, wherein at least one calibration marker comprises a predefined pattern, such as a checkered pattern.

7. The method according to claim 1, wherein said method is initiated in that said road surveillance system recognizes said at least one of said calibration markings.

8. The method according to claim 1, wherein said calibration is performed in that when a deviation between a measured position, measured by different position measurement systems, and a reference position is determined, a correction is added to an algorithm adjusting the measured position to correspond to the reference position.

9. The method according to claim 1, wherein the road surveillance system issues a maintenance alert if any one of the plurality of vehicle surveillance means fail and/or if a comparison between a measured distance between the positions of said calibration markers and a reference distance between the positions of said calibration markers exceeds a threshold value.

10. A road surveillance system:
    the road surveillance system comprising:
        a plurality of vehicle surveillance means, said plurality of vehicle surveillance means being synchronized by a global timing signal, having at least partly equal coverage of a surveillance area, and comprising at least a first and a second vehicle surveillance means, wherein said plurality of vehicle surveillance means are adapted to measure a position of a vehicle passing said surveillance area, controlled by an electronic control unit (ECU), and synchronized with a global timing signal;

wherein in order to calibrate said plurality of vehicle surveillance means such that a position determination of said plurality of vehicle surveillance means are equal, the road surveillance system, to perform a calibration, is adapted to:

monitor said surveillance area of a road;

pass a calibration vehicle through said surveillance area, wherein said calibration vehicle is provided with a plurality of predefined calibration markers, wherein at least one marker is assigned to each of said plurality of vehicle surveillance means and said calibration markers are provided at predetermined positions upon said calibration vehicle, wherein during the passage of said calibration vehicle through said surveillance area each vehicle surveillance means;

measure a position of its assigned calibration markers, wherein said measuring is performed at a predetermined time, and select a reference vehicle surveillance means, which defines a reference coordinate system, compare said measured position of a calibration marker assigned to a vehicle surveillance means with a position of a calibration marker assigned to said reference vehicle surveillance means, and calibrate said plurality of vehicle surveillance means such that the position of the respective calibration markers in said reference coordinate system correspond to an expected position in said reference coordinate system.

11. The road surveillance system according to claim 10, wherein the road surveillance system is a road toll system.

12. The road surveillance system according to claim 10, wherein said position measurements are performed a plurality of a number of times during the passage of said calibration vehicle.

13. The road surveillance system according to claim 10, wherein said plurality of vehicle surveillance means at least comprises a video tracking device and a microwave transceiver.

14. The road surveillance system according to claim 13, wherein said plurality of vehicle surveillance means further comprises an identification registration camera.

15. The road surveillance system according to claim 14, wherein a position measured by said identification registration camera is interpolated or extrapolated to an updated position corresponding to a position measured at the same predetermined time as the first and second vehicle surveillance means.

16. The road surveillance system according to claim 10, wherein at least one calibration marker comprises a predefined pattern, such as a checkered pattern.

17. The road surveillance system according to claim 10, wherein said calibration is initiated in that said road surveillance system recognizes said at least one of said calibration markings.

18. The road surveillance system according to claim 10, wherein the road surveillance system is adapted to perform said calibration in that when a deviation between a measured position, measured by different position measurement systems, and a reference position is determined, a correction is added to an algorithm adjusting the measured position to correspond to the reference position.

19. The road surveillance system according to claim 10, wherein the road surveillance system is adapted to issue a maintenance alert if any one of the plurality of vehicle surveillance means fail and/or if a comparison between a measured distance between the positions of said calibration markers and a reference distance between the positions of said calibration markers exceeds a threshold value.

* * * * *